United States Patent
Shua

(10) Patent No.: US 11,775,326 B2
(45) Date of Patent: Oct. 3, 2023

(54) TECHNIQUES FOR SECURING A PLURALITY OF VIRTUAL MACHINES IN A CLOUD COMPUTING ENVIRONMENT

(71) Applicant: Orca Security Ltd., Tel Aviv-Jaffa (IL)

(72) Inventor: Avi Shua, Tel Aviv-Jaffa (IL)

(73) Assignee: Orca Security Ltd., Tel Aviv (IL)

( * ) Notice: Subject to any disclaimer, the term of this patent is extended or adjusted under 35 U.S.C. 154(b) by 45 days.

(21) Appl. No.: 18/055,181

(22) Filed: Nov. 14, 2022

(65) Prior Publication Data

US 2023/0087080 A1    Mar. 23, 2023

Related U.S. Application Data

(63) Continuation of application No. 17/330,998, filed on May 26, 2021, now Pat. No. 11,516,231, which is a continuation of application No. 16/585,967, filed on Sep. 27, 2019, now Pat. No. 11,431,735.

(60) Provisional application No. 62/797,718, filed on Jan. 28, 2019.

(51) Int. Cl.
| | |
|---|---|
| *H04L 9/40* | (2022.01) |
| *G06F 9/455* | (2018.01) |
| *G06F 16/11* | (2019.01) |
| *G06F 11/14* | (2006.01) |

(52) U.S. Cl.
CPC ........ *H04L 63/1416* (2013.01); *G06F 9/45558* (2013.01); *G06F 11/1464* (2013.01); *G06F 16/128* (2019.01); *H04L 63/1433* (2013.01); *H04L 63/1441* (2013.01); *G06F 2009/45562* (2013.01); *G06F 2009/45583* (2013.01); *G06F 2009/45587* (2013.01); *G06F 2009/45591* (2013.01); *G06F 2009/45595* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 9,069,983 | B1 | 6/2015 | Nijjar |
| 9,177,145 | B2 | 11/2015 | Todorović |
| 9,229,758 | B2 | 1/2016 | Ammons et al. |
| 9,268,689 | B1 | 2/2016 | Chen et al. |
| 9,519,781 | B2 | 12/2016 | Golshan et al. |

(Continued)

OTHER PUBLICATIONS

"IBM Point of View Security and Cloud Computing", IBM Smart-Cloud Enterprise, Cloud Computing White Paper, 13 sheets of cover pages and pages 1-20, (2009).
Advisory Action U.S. Appl. No. 17/361,861 dated May 20, 2022, in the United States Patent and Trademark Office.

(Continued)

*Primary Examiner* — Joseph P Hirl
*Assistant Examiner* — Hassan Saadoun
(74) *Attorney, Agent, or Firm* — Finnegan, Henderson, Farabow, Garrett & Dunner, L.L.P.

(57) ABSTRACT

A system and method for securing virtual cloud assets in a cloud computing environment against cyber threats. The method includes: determining a location of a snapshot of at least one virtual disk of a protected virtual cloud asset, wherein the virtual cloud asset is instantiated in the cloud computing environment; accessing the snapshot of the virtual disk based on the determined location; analyzing the snapshot of the protected virtual cloud asset to detect potential cyber threats risking the protected virtual cloud asset; and alerting detected potential cyber threats based on a determined priority.

28 Claims, 4 Drawing Sheets

(56) References Cited

U.S. PATENT DOCUMENTS

| | | | |
|---|---|---|---|
| 9,563,777 | B2 | 2/2017 | Deng et al. |
| 9,734,325 | B1 | 8/2017 | Neumann et al. |
| 9,756,070 | B1 | 9/2017 | Crowell et al. |
| 9,798,885 | B2 | 10/2017 | Deng et al. |
| 9,858,105 | B1 | 1/2018 | Upadhyay et al. |
| 10,079,842 | B1 | 9/2018 | Brandwine et al. |
| 10,402,560 | B2 | 9/2019 | Gilbert |
| 10,412,109 | B2 | 9/2019 | Loureiro et al. |
| 10,469,304 | B1 | 11/2019 | Kempe et al. |
| 10,534,915 | B2 | 1/2020 | Cherny et al. |
| 10,536,471 | B1* | 1/2020 | Derbeko et al. ........ G06F 21/53 |
| 10,782,952 | B1 | 9/2020 | Doring et al. |
| 10,944,778 | B1* | 3/2021 | Golan et al. ........ H04L 63/1491 |
| 11,068,353 | B1* | 7/2021 | Ved .................... G06F 9/45558 |
| 11,120,124 | B2 | 9/2021 | Fusenig et al. |
| 11,216,563 | B1 | 1/2022 | Veselov et al. |
| 11,431,735 | B2 | 8/2022 | Shua |
| 11,516,231 | B2 | 11/2022 | Shua |
| 2007/0266433 | A1 | 11/2007 | Moore |
| 2008/0189788 | A1 | 8/2008 | Bahl |
| 2008/0263658 | A1 | 10/2008 | Michael et al. |
| 2009/0007100 | A1 | 1/2009 | Field et al. |
| 2010/0017512 | A1 | 1/2010 | Ciano et al. |
| 2011/0289584 | A1 | 11/2011 | Palagummi |
| 2012/0323853 | A1 | 12/2012 | Fries et al. |
| 2013/0191643 | A1* | 7/2013 | Song et al. .......... H04L 9/3265 713/176 |
| 2014/0096135 | A1 | 4/2014 | Kundu et al. |
| 2014/0137190 | A1 | 5/2014 | Carey et al. |
| 2015/0052520 | A1 | 2/2015 | Crowell et al. |
| 2016/0004449 | A1* | 1/2016 | Lakshman et al. .. G06F 3/0604 711/162 |
| 2016/0094568 | A1* | 3/2016 | Balasubramanian et al. .............. G06F 9/45558 726/23 |
| 2016/0364255 | A1 | 12/2016 | Chefalas et al. |
| 2017/0011138 | A1 | 1/2017 | Venkatesh et al. |
| 2017/0031704 | A1 | 2/2017 | Sudhakaran et al. |
| 2017/0103212 | A1* | 4/2017 | Deng et al. .......... G06F 3/0619 |
| 2017/0111384 | A1 | 4/2017 | Loureiro et al. |
| 2018/0137032 | A1 | 5/2018 | Tannous et al. |
| 2018/0255080 | A1 | 9/2018 | Paine |
| 2018/0293374 | A1 | 10/2018 | Chen |
| 2020/0042707 | A1 | 2/2020 | Kucherov et al. |

OTHER PUBLICATIONS

Almulla et al., "Digital Forensic of a Cloud Based Snapshot", The Sixth International Conference on Innovative Computing Technology (INTECH 2016), pp. 724-729, (2016).

Ammons et al., "Virtual machine images as structured data: the Mirage image library", IBM Research, Cover sheet 2 pages and pages 1-6, (2011).

Bugiel et al., "AmazonIA: When Elasticity Snaps Back", CCS' 11, ACM, pp. 389-400, (2011).

Cui et al., "A Less Resource-Consumed Security Architecture on Cloud Platform", Wuhan University Journal of Natural Sciences, vol. 21, No. 5, pp. 407-414, (2016).

Fernandez et al. "Building a security reference architecture for cloud systems", Springer, Requirements Eng, vol. 21, pp. 225-249, (2016).

Fernandez et al., "Two patterns for cloud computing: Secure Virtual Machine Image Repository and Cloud Policy Management Point", PLoP '13: Proceedings of the 20th Conference on Pattern Languages of Programs Oct. 2013 Article No.: 15, Association for Computing Machinery (ACM), Cover sheet and pages 1-11, (2013).

Final Office Action U.S. Appl. No. 17/330,998 dated Jun. 30, 2022, in the United States Patent and Trademark Office.

Final Office Action U.S. Appl. No. 17/361,861 dated Mar. 8, 2022, in the United States Patent and Trademark Office.

Kaur et al., "Secure VM Backup and Vulnerability Removal in Infrastructure Clouds", 2014 International Conference on Advances in Computing, Communications and Informatics (ICACCI), pp. 1217-1226, (2014).

Non-Final Office Action U.S. Appl. No. 16/585,967 dated Feb. 3, 2022, in the United States Patent and Trademark Office.

Non-Final Office Action U.S. Appl. No. 17/330,998 dated Mar. 4, 2022, in the United States Patent and Trademark Office.

Non-Final Office Action U.S. Appl. No. 17/361,861 dated Aug. 29, 2022, in the United States Patent and Trademark Office.

Non-Final Office Action U.S. Appl. No. 17/361,861 dated Oct. 25, 2021, in the United States Patent and Trademark Office.

Notice of Allowance U.S. Appl. No. 16/585,967 dated Jul. 7, 2022, in the United States Patent and Trademark Office.

Notice of Allowance U.S. Appl. No. 17/330,998 dated Aug. 10, 2022, in the United States Patent and Trademark Office.

Pandey et al., "An Approach for Virtual Machine Image Security", Computer Science and Engineering MNNIT, Allahabad, 2014 International Conference on Signal Propagation and Computer Technology (ICSPCT), pp. 616-623, (2014).

Rajasekaran et al., "Scalable Cloud Security via Asynchronous Virtual Machine Introspection", 8th USENIX Workshop on Hot Topics in Cloud Computing, Cover page and pages 1-6, (2016).

Rani et al.; "An Efficient Approach to Forensic Investigation in Cloud using VM Snapshots", 2015 International Conference on Pervasive Computing (ICPC), 5 pages, (2015).

Wei et al., "Managing Security of Virtual Machine Images in a Cloud Environment", CCSW'09, pp. 91-96, Nov. 13, 2009.

* cited by examiner

TECHNIQUES FOR SECURING A PLURALITY OF VIRTUAL MACHINES IN A CLOUD COMPUTING ENVIRONMENT

This application is a continuation of U.S. Application No. 17/330,998 (now U.S. Patent No. 11,516,231), filed May 26, 2021, which is a continuation of U.S. Application No. 16/585,967 (now U.S. Patent No. 11,431,735), filed September 27, 2019, which claims the benefit of U.S. Provisional Applicantion No. 62/797,718 filed on January 28, 2019, the contents of each of which are hereby incorporated by reference in their entireties.

TECHNICAL FIELD

This disclosure relates generally to cyber-security systems and, more specifically, to techniques for securing virtual machines.

BACKGROUND

Organizations have increasingly adapted their applications to be run from multiple cloud computing platforms. Some leading public cloud service providers include Amazon®, Microsoft®, Google®, and the like.

Virtualization is a key role in a cloud computing, allowing multiple applications and users to share the same cloud computing infrastructure. For example, a cloud storage service can maintain data of multiple different users.

In one instance, virtualization can be achieved by means of virtual machines. A virtual machine emulates a number of "computers" or instances, all within a single physical device. In more detail, virtual machines provide the ability to emulate a separate operating system (OS), also referred to as a guest OS, and therefore a separate computer, from an existing OS (the host). This independent instance is typically isolated as a completely standalone environment.

Modern virtualization technologies are also adapted by cloud computing platforms. Examples for such technologies include virtual machines, software containers, and serverless functions. With their computing advantages, applications and virtual machines running on top of virtualization technologies are also vulnerable to some cyber threats. For example, virtual machines can execute vulnerable software applications or infected operating systems.

Protection of a cloud computing infrastructure, and particularly of virtual machines can be achieved via inspection of traffic. Traditionally, traffic inspection is performed by a network device connected between a client and a server (deployed in a cloud computing platform or a data center) hosting virtual machines. Traffic inspection may not provide an accurate indication of the security status of the server due to inherent limitations, such as encryption and whether the necessary data is exposed in the communication.

Furthermore, inspection of computing infrastructure may be performed by a network scanner deployed out of path. The scanner queries the server to determine if the server executes an application that possess a security threat, such as vulnerability in the application. The disadvantage of such a scanner is that the server may not respond to all queries by the scanner, or not expose the necessary data in the response. Further, the network scanner usually communicates with the server, and the network configuration may prevent it. In addition, some types of queries may require credentials to access the server. Such credentials may not be available to the scanner.

Traffic inspection may also be performed by a traffic monitor that listens to traffic flows between clients and the server. The traffic monitor can detect some cyber threats, e.g., based on the volume of traffic. However, the monitor can detect threats only based on the monitored traffic. For example, misconfiguration of the server may not be detected by the traffic monitor. As such, traffic monitoring would not allow detection of vulnerabilities in software executed by the server.

To overcome the limitations of traffic inspection solutions, some cyber-security solutions, such as vulnerability management and security assessment solutions are based on agents installed in each server in a cloud computing platform or data center. Using agents is a cumbersome solution for a number of reasons, including IT resources management, governance, and performance. For example, installing agents in a large data center may take months.

It would therefore be advantageous to provide a security solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for securing virtual cloud assets in a cloud computing environment against cyber threats, comprising: determining a location of a snapshot of at least one virtual disk of a protected virtual cloud asset, wherein the virtual cloud asset is instantiated in the cloud computing environment; accessing the snapshot of the virtual disk based on the determined location; analyzing the snapshot of the protected virtual cloud asset to detect potential cyber threats risking the protected virtual cloud asset; and alerting detected potential cyber threats based on a determined priority.

Certain embodiments disclosed herein also include a non-transitory computer readable medium having stored thereon instructions for causing a processing circuitry to execute a process, the process comprising: determining a location of a snapshot of at least one virtual disk of a protected virtual cloud asset, wherein the virtual cloud asset is instantiated in the cloud computing environment; accessing the snapshot of the virtual disk based on the determined location; analyzing the snapshot of the protected virtual cloud asset to detect potential cyber threats risking the protected virtual cloud asset; and alerting detected potential cyber threats based on a determined priority.

Certain embodiments disclosed herein also include a system for securing virtual cloud assets in a cloud computing environment against cyber threats, comprising: a processing circuitry; and a memory, the memory containing instructions that, when executed by the processing circuitry, configure the system to: determine a location of a snapshot of at least one virtual disk of a protected virtual cloud asset, wherein the virtual cloud asset is instantiated in the cloud computing environment; access the snapshot of the virtual disk based on the determined location; analyze the snapshot of the protected virtual cloud asset to detect potential cyber threats risking the protected virtual cloud asset; and alert detected potential cyber threats based on a determined priority.

BRIEF DESCRIPTION OF THE DRAWINGS

The foregoing and other objects, features, and advantages of the disclosed embodiments will be apparent from the following detailed description taken in conjunction with the accompanying drawings.

DETAILED DESCRIPTION

Figure 1A:
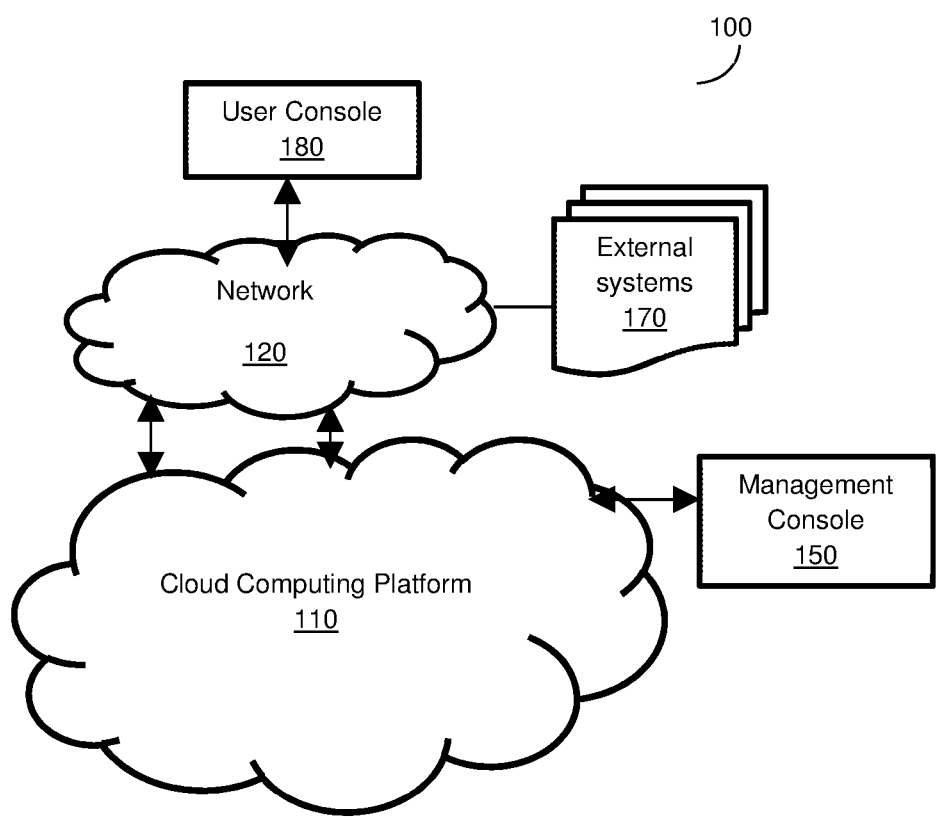
FIGS. 1A and 1B are network diagrams utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 1B:
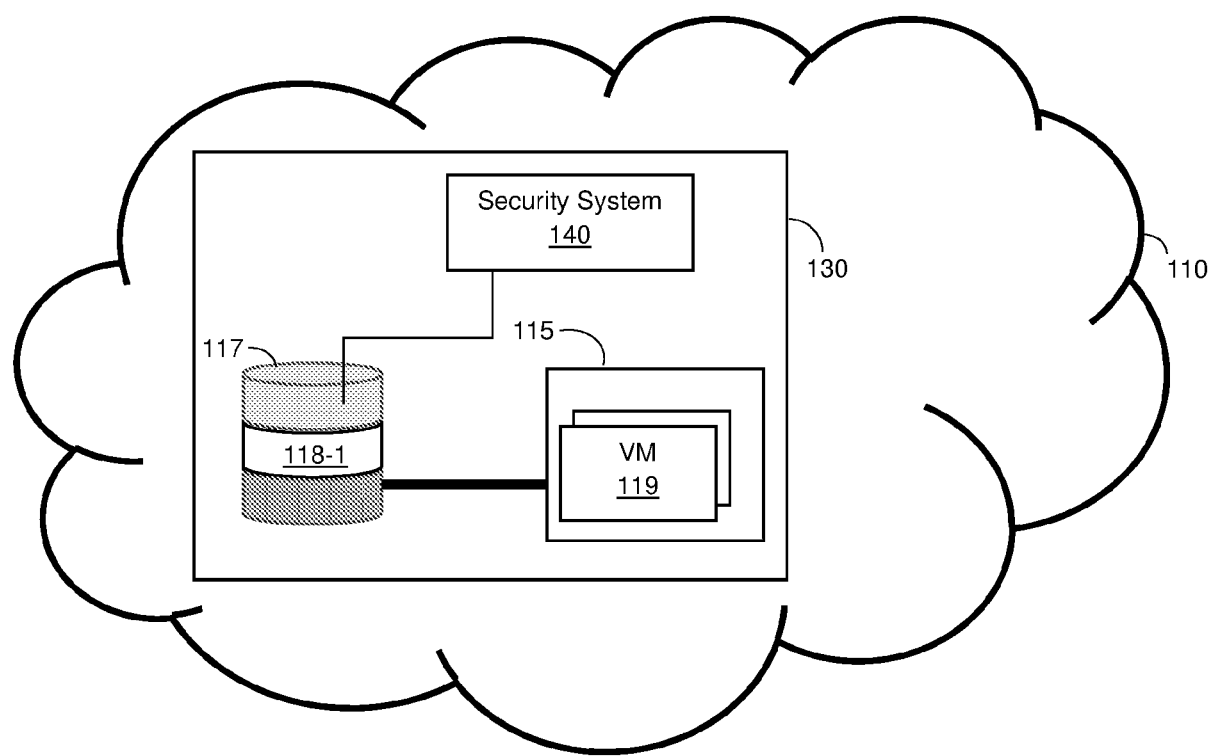

FIGS. 1A and 1B show an example network diagram 100 utilized to describe the various embodiments. A cloud computing platform 110 is communicably connected to a network 120. Examples of the cloud computing platform 110 may include a public cloud, a private cloud, a hybrid cloud, and the like. Examples for a public cloud, but are not limited to, AWS® by Amazon®, Microsoft Azure®, Google Cloud®, and the like. In some configurations, the disclosed embodiments operable in on premise virtual machines environments. The network 120 may be the Internet, the world-wide-web (WWW), a local area network (LAN), a wide area network (WAN), and other networks.

The arrangement of the example cloud computing platform 110 is shown in FIG. 1B. As illustrated, the platform 110 includes a server 115 and a storage 117, serving as the storage space for the server 115. The server 115 is a physical device hosting at least one virtual machine (VM) 119. The VM 119 is a protected VM, which may be any virtual cloud asset including, but not limited to, a software container, a micro-service, a serverless function, and the like.

The storage 117 emulates virtual discs for the VMs executed in by the server 115. The storage 117 is typically connected to the server 115 through a high-speed connection, such as optic fiber allowing fast retrieval of data. In other configurations, the storage 117 may be part of the server 115. In this example illustrated in FIG. 1B, virtual disk 118-1 is allocated for the VM 119. The server 115, and hence the VM 119, may be executed in a client environment 130 within the platform 110.

The client environment 130 is an environment within the cloud computing platform 110 utilized to execute cloud-hosted applications of the client. A client may belong to a specific tenant. In some example embodiment, the client environment 130 may be part of a virtualized environment or on-premises virtualization environment, such as a VMware® based solution.

Also deployed in the cloud computing platform 110 is a security system 140 configured to perform the various disclosed embodiments. In some embodiments, the system 140 may be part of the client environment 130. In an embodiment, the security system 140 may be realized as a physical machine configured to execute a plurality of virtual instances, such as, but not limited to virtual machines executed by a host server. In yet another embodiment, the security system 140 may be realized as a virtual machine executed by a host server. Such a host server is a physical machine (device) and may be either the server 115, a dedicated server, a different shared server, or another virtualization-based computing entity, such as a serverless function.

In an embodiment, the interface between the client environment 130 and the security system 140 can be realized using APIs or services provided by the cloud computing platform 110. For example, in AWS, a cross account policy service can be utilized to allow interfacing the client environment 130 with the security system 140.

In the deployment, illustrated in FIGS. 1, the configuration of resources of the cloud computing platform 110 is performed by means of the management console 150. As such, the management console 150 may be queried on the current deployment and settings of resources in the cloud computing platform 110. Specifically, the management console 150 may be queried, by the security system 140, about as the location (e.g., virtual address) of the virtual disk 118-1 in the storage 117. The system 140 is configured to interface with the management console 150 through, for example, an API.

In some example embodiments, the security system 140 may further interface with the cloud computing platform 110 and external systems 170. The external systems may include intelligence systems, security information and event management (SIEM) systems, and mitigation tools. The external intelligence systems may include common vulnerabilities and exposures (CVE®) databases, reputation services, security systems (providing feeds on discovered threats), and so on. The information provided by the intelligence systems may detect certain known vulnerabilities identified in, for example, a CVE database.

According to the disclosed embodiments, the security system 140 is configured to detect vulnerabilities and other cyber threats related to the execution VM 119. The detection is performed while the VM 119 is live, without using any agent installed in the server 115 or the VM 119, and without relying on cooperation from VM 119 guest OS. Specifically, the security system 140 can scan and detect vulnerable software, non-secure configuration, exploitation attempts, compromised asserts, data leaks, data mining, and so on. The security system 140 may be further utilized to provide security services, such as incident response, anti-ransomware, and cyber insurance by accessing the security posture.

In some embodiments, the security system 140 is configured to query the cloud management console 150 for the address of the virtual disk 118-1 serving the VM 119 and a location of the snapshot. A VM's snapshot is a copy of the machine's virtual disk (or disk file) at a given point in time. Snapshots provide a change log for the virtual disk and are used to restore a VM to a particular point in time when a failure error occurs. Typically, any data that was writable on a VM becomes read-only when the snapshot is taken. Multiple snapshots of a VM can be created at multiple possible point-in-time restore points. When a VM reverts to a snapshot, current disk and memory states are deleted and the snapshot becomes the new parent snapshot for that VM.

The snapshot of the VM 119 is located and may be saved from the virtual disk 118-1 is accessed by the system 140. In an embodiment, the VM's 119 snapshot may be copied to the system 140. If such a snapshot does not exist, the system 140 may take a new snapshot, or request such an action. The snapshots may be taken at a predefined schedule or upon predefined events (e.g., a network event or abnormal event). Further, the snapshots may be accessed or copied on a predefined schedule or upon predefined events. It should be noted that when the snapshot is taken or copied, the VM 119 still runs.

It should be noted that the snapshot of the virtual disk 118-1 may not be necessary stored in the storage 117, but for ease of the discussion it is assumed that the snapshot is saved in the storage 117. It should be further noted that the snapshot is being accessed without cooperation of the guest, virtual OS of the virtual machine.

The snapshot is parsed and analyzed by the security system 140 to detect vulnerabilities. This analysis of the snapshot does not require any interaction and/or information from the VM 119. As further demonstrated herein, the analysis of the snapshot by the system 140 does not require any agent installed on the server 115 or VM 119.

Various techniques can be utilized to analyze the snapshots, depending on the type of vulnerability and cyber threats to be detected. Following are some example embodiments for techniques that may be implemented by the security system 140.

In an embodiment, the security system 140 is configured to detect whether there is vulnerable code executed by the VM 119. The VM 119 being checked may be running, paused, or shutdown. To this end, the security system 140 is configured to match installed application lists, with their respective versions, to a known list of vulnerable applications. Further, the security system 140 may be configured to match the application files, either directly (using binary comparison) or by computing a cryptographic hash against database of files in vulnerable applications. The matching may be also on sub-modules of an application. Alternatively, the security system 140 may read installation logs of package managers used to install the packages of the application.

In yet another embodiment, the security system 140 is configured to verify whether the vulnerability is relevant to the VM 119. For example, if there is a vulnerable version or module not in use, the priority of that issue is reduced dramatically.

To this end, the security system 140 may be configured to check the configuration files of the applications and operating system of the VM 119; to verify access times to files by the operating system; and/or to analyze the active application and/or system logs in order to deduce what applications and modules are running.

In yet another embodiment, the security system 140 may instantiate a copy of the VM 119 and/or a subset of applications of the VM 119 on the server 115 or a separate server and monitor all activity performed by the instance of the VM. The execution of the instance of the VM is an isolated sandbox, which can be a full VM or subset of it, such as a software container (e.g., Docker® container) or another virtualized instances. The monitored activity may be further analyzed to determine abnormality. Such analysis may include monitoring of API activity, process creation, file activity, network communication, registry changes, and active probing of the said subset in order to assess its security posture. This may include, but not limited to, actively communicating with the VM 119, using either legitimate communicate and/or attack attempts, to assess its posture and by that deriving the security posture of the entire VM 119.

In order to determine if the vulnerability is relevant to the VM 119, the security system 140 is configured to analyze the machine memory, as reflected in the page file. The page file is saved in the snapshot and extends how much system-committed memory (also known as "virtual memory") a system can back. In an embodiment, analyzing the page file allows deduction of running applications and modules by the VM 119.

In an embodiment, the security system 140 is configured to read process identification number (PID) files and check their access or write times, which are matched against process descriptors. The PID can be used to deduce which processes are running, and hence the priority of vulnerabilities detected in processes existing on the disk. It should be noted the PID files are also maintained in the snapshot.

In yet another embodiment, the security system 140 is configured to detect cyber threats that do not represent vulnerabilities. For example, the security system 140 may detect and alert on sensitive data not being encrypted on the logical disk, private keys found on the disks, system credentials stored clearly on the disk, risky application features (e.g., support of weak cipher suites or authentication methods), weak passwords, weak encryption schemes, a disable address space layout randomization (ASLR) feature, suspicious manipulation to a boot record, suspicious PATH, LD_LIBRARY_PATH, or LD_PRELOAD definitions, services running on startup, and the like.

In an embodiment, the security system 140 may further monitor changes in sensitive machine areas, and alert on unexpected changes (e.g., added or changed application files without installation). In an example embodiment, this can be achieved by computing a cryptographic hash of the sensitive areas in the virtual disk and checking for differences over time.

In some embodiments, the detected cyber threats (including vulnerabilities) are reported to a user console 180 and/or a security information and event management (SIEM) system (not shown). The reported cyber threats may be filtered or prioritized based in part on their determined risk. Further, the reported cyber threats may be filtered or prioritized based in part on the risk level of the machine. This also reduces the number of alerts reported to the user.

In an embodiment, any detected cyber threats related to sensitive data (including personally identifiable information, PII) is reported at a higher priority. In an embodiment, such data is determined by searching for the PII, analyzing the application logs to determine whether the machine accessed PII/PII containing servers, or whether the logs themselves contain PII, and searching the machine memory, as reflected in the page file, for PII.

In an embodiment, the security system 140 may determine the risk of the VM 119 based on communication with an untrusted network. This can be achieved by analyzing the VM's 119 logs as saved in the virtual disk and can be derived from the snapshot.

In an example embodiment, the security system 140 may cause an execution of one or more mitigation actions. Examples of such actions may include blocking traffic from untrusted networks, halting the operation of the VM, quarantining an infected VM, and the like. The mitigation actions may be performed by a mitigation tool and not the system 140.

It should be noted that the example implementation shown in FIGS. 1 is described with respect to a single cloud computing platform 110 hosting a single VM 119 in a single server 115, merely for simplicity purposes and without limitation on the disclosed embodiments. Typically, virtual machines are deployed and executed in a single cloud computing platform, a virtualized environment, or data center and can be protected without departing from the scope of the disclosure. It should be further noted that the disclosed embodiments can operate using multiple security systems 140, each of which may operate in a different client environment.

Figure 2:
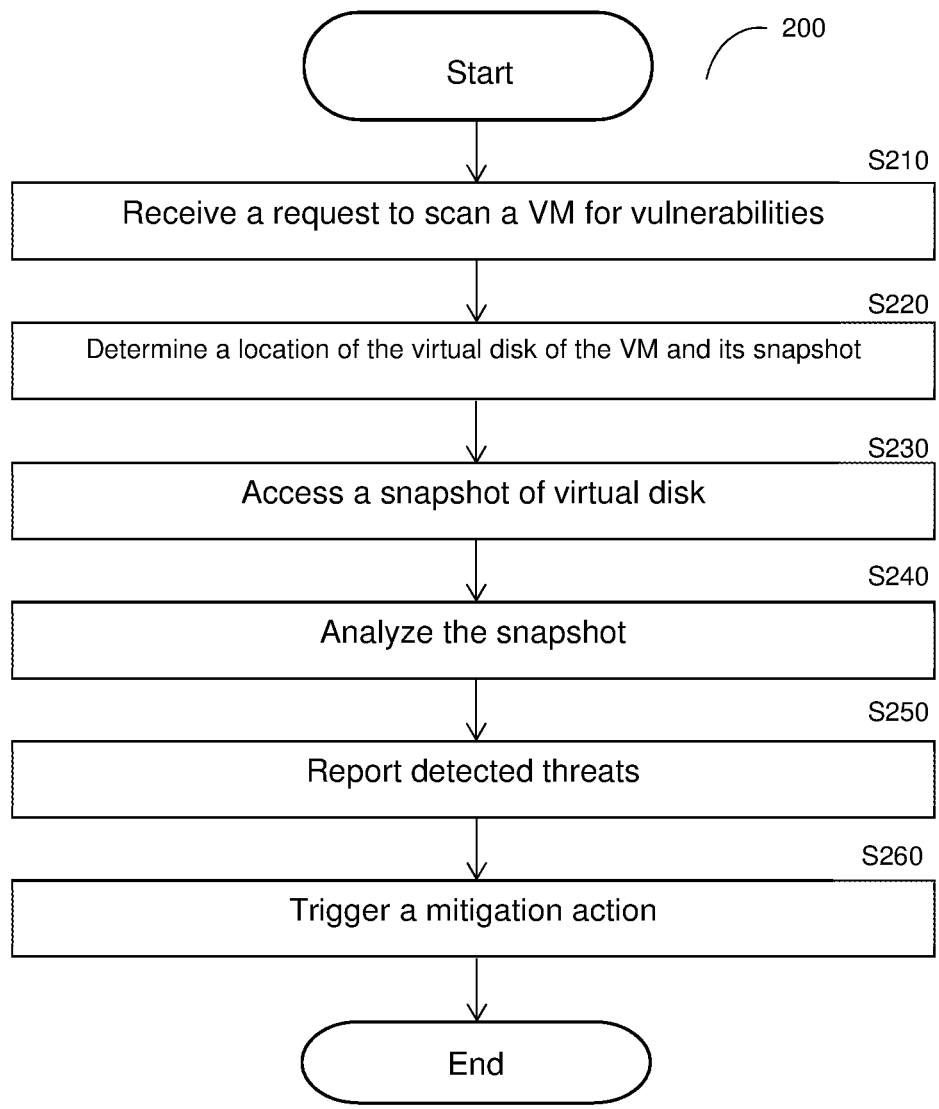
FIG. 2 is a flowchart illustrating a method detecting cyber threats, including potential vulnerabilities in virtual machines executed in a cloud computing platform according to some embodiments.

FIG. 2 shows an example flowchart 200 illustrating a method for detecting cyber threats including potential vulnerabilities in virtual machines executed in a cloud computing platform according to some embodiments. The method may be performed by the security system 140.

At S210, a request, for example, to scan a VM for vulnerabilities is received. The request may be received, or otherwise triggered every predefined time interval or upon detection of an external event. An external event may be a preconfigured event, such as a network event or abnormal event including, but not limited to, changes to infrastructure such as instantiation of an additional container on existing VM, image change on a VM, new VM created, unexpected shutdowns, access requests from unauthorized users, and the like. The request may at least designate an identifier of the VM to be scanned.

At S220, a location of a snapshot of a virtual disk of the VM to be scanned is determined. In an embodiment, S220 may include determining the virtual disk allocated for the VM, prior to determining the location of the snapshot. As noted above, this can be achieved by querying a cloud management console. At S230, a snapshot of the virtual disk is accessed, or otherwise copied.

At S240, the snapshot is analyzed to detect cyber threats and potential vulnerabilities. S240 may be also include detecting cyber threats that do not represent vulnerabilities. Examples for cyber threats and vulnerabilities are provided above.

In an embodiment, S240 may include comparing the snapshot to some baseline, which may include, but is not limited to, a copy of the image used to create the VM, (e.g., lists of applications, previous snapshots), cryptographic hashes gathered in the previous scan, analyzing logs of the VMs, instantiating a copy of the VM and executing the instance or applications executed by the VM in a sandbox, analyzing the machine memory, as reflected in the page file, or any combination of these techniques. Some example embodiments for analyzing the snapshots and the types of detected vulnerabilities and threats are provided above.

At S250, the detected cyber threats and/or vulnerabilities are reported, for example, as alerts. In an embodiment, S250 may include filtering and prioritizing the reported alerts. In an embodiment, the prioritization is based, in part, on the risk level of a vulnerable machine. The filtering and prioritizing allow to reduce the number of alerts reported to the user. The filtering can be done performed on external intelligence on the likelihood of this vulnerability being exploited, analyzing the machine configuration in order to deduce the vulnerability relevancy, and correlating the vulnerability with the network location, and by weighting the risk of this machine being taken over by the attacker by taking into consideration the criticality of the machine in the organization based by the contents stored or other assets accessible from the VM 110.

At optional S260, a mitigation action may be triggered to mitigate a detected threat or vulnerability. A mitigation action may be executed by a mitigation tool and triggered by the system 140. Such an action may include blocking traffic from untrusted networks, halting the operation of the VM, quarantining an infected VM, and the like.

Figure 3:
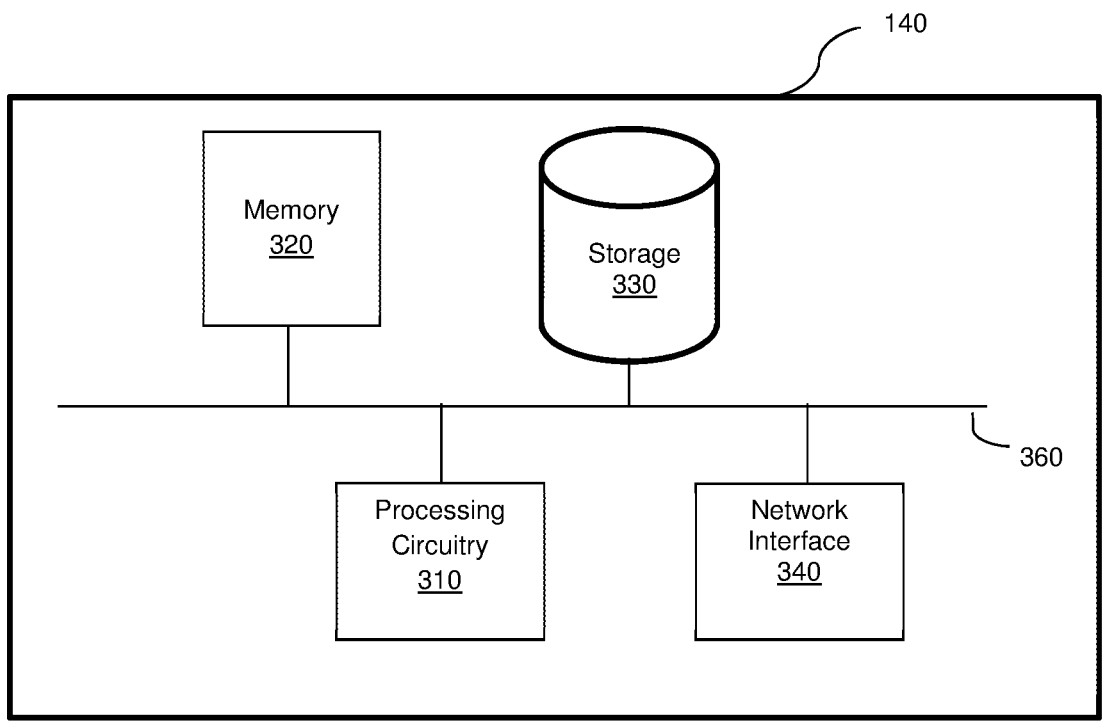
FIG. 3 is an example block diagram of the security system according to an embodiment.

FIG. 3 is an example block diagram of the security system 140 according to an embodiment. The security system 140 includes a processing circuitry 310 coupled to a memory 320, a storage 330, and a network interface 340. In an embodiment, the components of the security system 140 may be communicatively connected via a bus 360.

The processing circuitry 310 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 310 may be volatile (e.g., RAM, etc.), non-volatile (e.g., ROM, flash memory, etc.), or a combination thereof. In one configuration, computer readable instructions to implement one or more embodiments disclosed herein may be stored in the storage 330.

In another embodiment, the memory 320 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 310 to perform the various processes described herein. Specifically, the instructions, when executed, cause the processing circuitry 310 to determine over-privileged roles vulnerabilities in serverless functions.

The storage 330 may be magnetic storage, optical storage, and the like, and may be realized, for example, as flash memory or other memory technology, CD-ROM, Digital Versatile Disks (DVDs), hard-drives, SSD, or any other medium which can be used to store the desired information. The storage 330 may store communication consumption patterns associated with one or more communications devices.

The network interface 340 allows the security system 140 to communicate with the external systems, such as intelligence systems, SIEM systems, mitigation systems, a cloud management console, a user console, and the like.

It should be understood that the embodiments described herein are not limited to the specific architecture illustrated in FIG. 3, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for securing virtual cloud assets against cyber vulnerabilities in a cloud computing environment, the method comprising:
   receiving a request to scan a plurality of protected virtual cloud assets in the cloud computing environment;
   for each of the requested plurality of protected virtual cloud assets in the cloud computing environment:
      determining, using an API or service provided by the cloud computing environment, a location of a snapshot of at least one virtual disk of a respective protected virtual cloud asset,
      accessing, based on the determined location and using an API or service provided by the cloud computing environment, the snapshot of the at least one virtual disk,
      analyzing the snapshot of the at least one virtual disk to determine an existence of potential cyber vulnerabilities, and
      determining a risk associated with each of the determined potential cyber vulnerabilities, and
   for each of the requested plurality of protected virtual cloud assets with the determined potential cyber vulnerabilities, determining a risk level to the cloud computing environment; and
   reporting, for each of the requested plurality of protected virtual cloud assets with the determined potential cyber vulnerabilities, the existence of the potential cyber vulnerabilities, such that the plurality of protected virtual cloud assets with the determined potential cyber vulnerabilities are prioritized based on associated risk levels.

2. The method of claim 1, wherein determining the location of the snapshot of at least one virtual disk further includes:
   taking a snapshot or requesting the taking of the snapshot; and
   obtaining the location of the snapshot after the snapshot is taken.

3. The method of claim 1, wherein determining the risk associated with each of the determined plurality of potential cyber vulnerabilities is based on external intelligence on a likelihood of the determined potential cyber vulnerability being exploited, the method further comprising, prior to reporting, filtering the determined potential cyber vulnerabilities based on the associated risk.

4. The method of claim 1, wherein analyzing the snapshot of the at least one virtual disk of the respective protected virtual cloud asset includes at least one of:
   matching installed applications with applications on a known list of vulnerable applications; or
   matching application files on the snapshot of the at least one virtual disk directly against application files associated with a known list of vulnerable applications.

5. The method of claim 4, wherein matching application files on the snapshot of the at least one virtual disk includes:
   computing a cryptographic hash against at least one application file to be matched; and
   matching the computed cryptographic hash against a database of files associated with a known list of vulnerable applications.

6. The method of claim 3, wherein determining the risk associated with one of the plurality of potential cyber vulnerabilities further comprises determining whether the one of the potential cyber vulnerabilities corresponds to an application that is in use by the respective protected virtual cloud asset.

7. The method of claim 3, wherein determining the risk of one of the plurality of potential cyber vulnerabilities includes determining whether the one of the plurality of potential cyber vulnerabilities corresponds to an application that is not in use by the respective protected virtual cloud asset.

8. The method of claim 7, wherein determining whether the matching installed applications are used by the respective protected virtual cloud asset includes checking configuration files of the matching installed applications to determine whether at least one of the matching installed applications is not in use, and wherein prioritizing reduces priority of the at least one matching installed application not in use.

9. The method of claim 1, wherein analyzing the snapshot of the at least one virtual disk of the respective protected virtual cloud asset further includes:
   parsing the snapshot of the at least one virtual disk; and
   scanning the parsed snapshot of the at least one virtual disk to detect the potential cyber vulnerabilities.

10. The method of claim 9, wherein scanning the parsed snapshot further includes at least one of:
    checking configuration files of applications and an operating system installed in the respective protected virtual cloud asset;
    verifying access times to files by the operating system installed in the in the respective protected virtual cloud asset; or
    analyzing system logs to deduce applications and modules executed in the respective protected virtual cloud asset.

11. The method of claim 1, further comprising mitigating at least one of the potential cyber vulnerabilities.

12. The method of claim 11, wherein mitigating one of the plurality of potential cyber vulnerabilities includes at least one of:
    blocking traffic from untrusted networks to the respective protected virtual cloud asset,
    halting operation of the respective protected virtual cloud asset, or quarantining the respective protected virtual cloud asset.

13. The method of claim 1, wherein determining the location of the snapshot of the at least one virtual disk of the respective protected virtual cloud asset further includes determining a specific virtual disk allocated to the respective protected virtual cloud asset.

14. The method of claim 1, wherein determining the location of the snapshot of at least one virtual disk further includes querying a cloud management console of the cloud computing environment for the location of the snapshot and the location of a specific virtual disk of the respective protected virtual cloud asset.

15. A non-transitory computer readable medium containing instructions that when executed by at least one processor cause the at least one processor to perform operations for securing virtual cloud assets against cyber vulnerabilities in a cloud computing environment, the operations comprising:
    receiving a request to scan a plurality of protected virtual cloud assets in the cloud computing environment;
    for each of the requested plurality of protected virtual cloud assets in the cloud computing environment:
        determining, using an API or service provided by the cloud computing environment, a location of a snapshot of at least one virtual disk of a respective protected virtual cloud asset,
        accessing, based on the determined location and using an API or service provided by the cloud computing environment, the snapshot of the at least one virtual disk,
        analyzing the snapshot of the at least one virtual disk to determine existence of a plurality of potential cyber vulnerabilities, and
        determining a risk associated with each of the determined potential cyber vulnerabilities;
    for each of the requested plurality of protected virtual cloud assets with the determined potential cyber vulnerabilities, determining a risk level to the cloud computing environment; and
    reporting, for each of the requested plurality of protected virtual cloud assets with the determined potential cyber vulnerabilities, the existence of the potential cyber vulnerabilities, such that the plurality of protected virtual cloud assets with the determined potential cyber vulnerabilities are prioritized based on associated risk levels.

16. The non-transitory computer readable medium of claim 15, wherein analyzing the snapshot of the at least one virtual disk of the respective protected virtual cloud asset includes matching installed applications with applications on a known list of vulnerable applications.

17. The non-transitory computer readable medium of claim 16, wherein analyzing the snapshot of the at least one virtual disk further includes matching application files on the snapshot of the at least one virtual disk directly against application files associated with a known list of vulnerable applications.

18. A system for securing virtual cloud assets against cyber vulnerabilities in a cloud computing environment, the system comprising:
    at least one processor configured to:
        receive a request to scan a plurality of protected virtual cloud assets in the cloud computing environment;
        for each of the requested plurality of protected virtual cloud assets in the cloud computing environment:
            determining, using an API or service provided by the cloud computing environment, a location of a snapshot of at least one virtual disk of a respective protected virtual cloud asset,
            accessing, based on the determined location and using an API or service provided by the cloud computing environment, the snapshot of the at least one virtual disk,
            analyzing the snapshot of the at least one virtual disk to determine existence of a plurality of potential cyber vulnerabilities, and
            determining a risk associated with each of the determined potential cyber vulnerabilities;
        for each of the requested plurality of protected virtual cloud assets with determined potential cyber vulnerabilities, determine a risk level to the cloud computing environment; and
        report, for each of the requested plurality of protected virtual cloud assets with the determined potential cyber vulnerabilities, the existence of potential cyber vulnerabilities, such that the plurality of protected virtual cloud assets with the determined potential cyber vulnerabilities are prioritized based on associated risk levels.

19. The system of claim 18, wherein determining the location of the snapshot of at least one virtual disk further includes:
    taking a snapshot or requesting the taking of the snapshot; and
    obtaining the location of the snapshot after the snapshot is taken.

20. The method of claim 7, wherein determining whether one of the plurality of potential cyber vulnerabilities corresponds to an application that is not in use by one of the respective protected virtual cloud assets lowers the risk associated with the potential cyber vulnerability.

21. The method of claim 1, wherein determining the risk level of a protected virtual cloud asset is based in part on the determined risks of existing potential cyber vulnerabilities on the protected virtual cloud asset.

22. The method of claim 1, wherein determining the risk level associated with a particular protected virtual cloud asset further includes:
    analyzing configurations for each of the requested plurality of protected virtual cloud assets in the cloud computing environment, and
    weighting a takeover risk of the particular protected virtual cloud asset.

23. The method of claim 22, wherein weighting the takeover risk of the particular protected virtual cloud asset includes correlating at least one of the determined potential cyber vulnerabilities with a network location of the particular protected virtual cloud asset.

24. The method of claim 22, wherein weighting the takeover risk of the particular protected virtual cloud asset includes determining a criticality of the particular protected virtual cloud asset in the cloud computing environment based on contents stored from the particular protected virtual cloud asset.

25. The method of claim 22, wherein weighting the takeover risk of the particular protected virtual cloud asset includes determining a criticality of the particular protected virtual cloud asset in the cloud computing environment based on other assets in the cloud computing environment that are accessible from the particular protected virtual cloud asset.

26. The method of claim 22, wherein weighting the takeover risk of the particular protected virtual cloud asset includes
    correlating at least one of the determined potential cyber vulnerabilities with a network location of the particular protected virtual cloud asset, and
    determining a criticality of the particular protected virtual cloud asset in the cloud computing environment based on other assets in the cloud computing environment that are accessible from the particular protected virtual cloud asset and based on the contents stored from the particular protected virtual cloud asset.

27. The method of claim 1, wherein determining the risk level associated with a particular protected virtual cloud asset further includes:
   analyzing a configuration for each of the requested plurality of protected virtual cloud assets in the cloud computing environment, and
   weighting a takeover risk of the particular protected virtual cloud asset.

28. The method of claim 1, wherein reporting potential cyber vulnerabilities for a particular protected virtual cloud asset further includes prioritizing the reported potential cyber vulnerabilities based on the risk level associated with the particular protected virtual cloud asset.

\* \* \* \* \*